May 9, 1967 M. E. KISE 3,318,044
ARTIFICIAL SUPPORTING MEANS FOR NATURAL FLOWERS
Filed Oct. 20, 1965 2 Sheets-Sheet 1
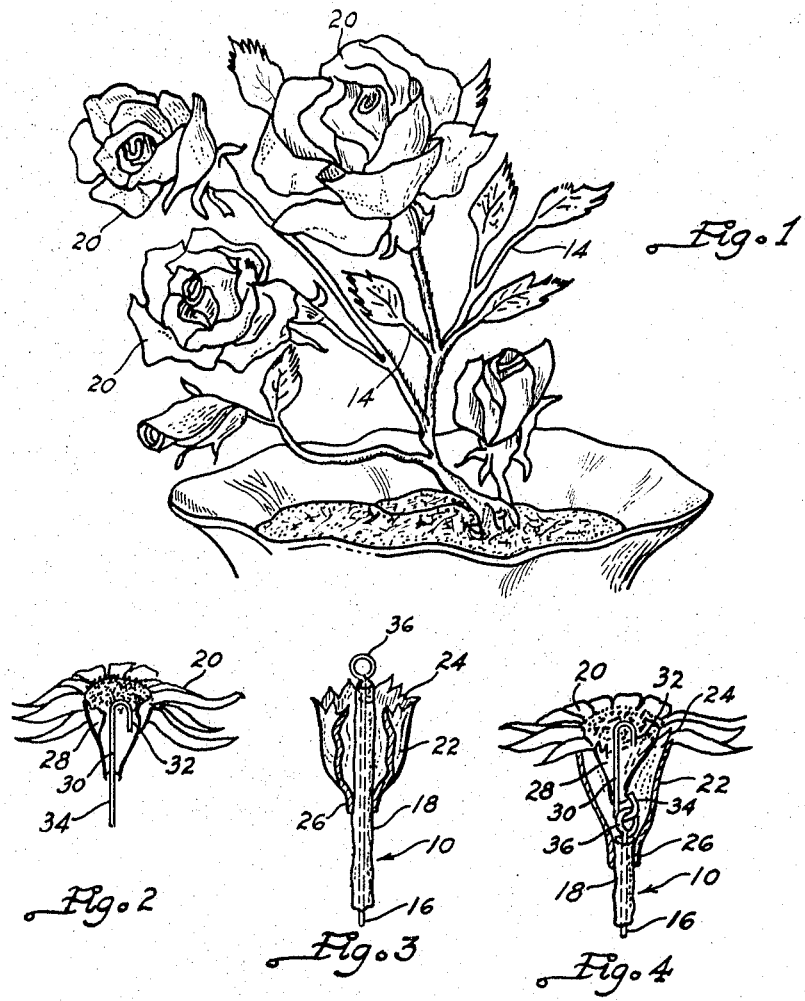
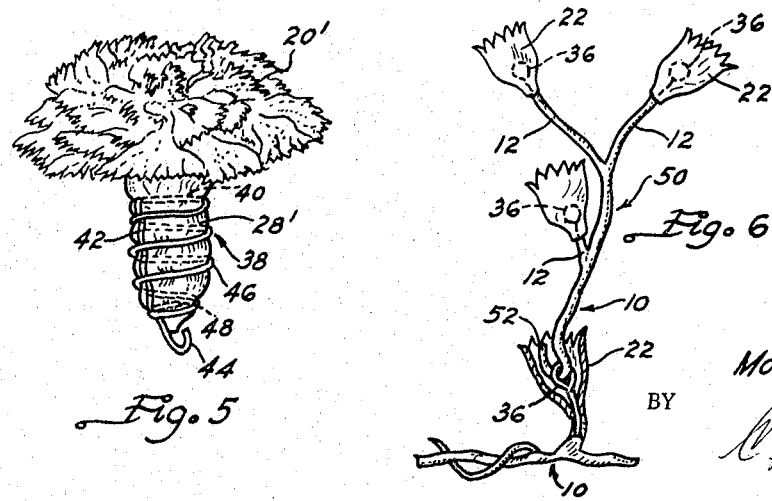
INVENTOR.
MORTON E. KISE
BY
ATTORNEY

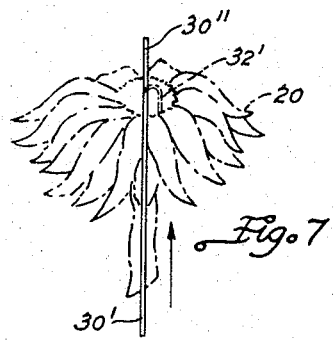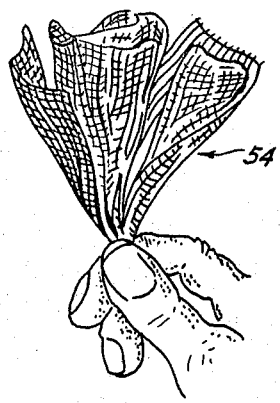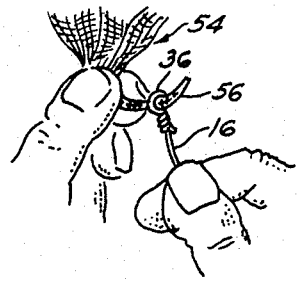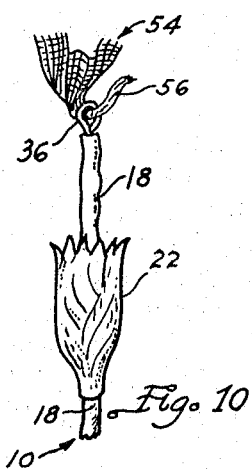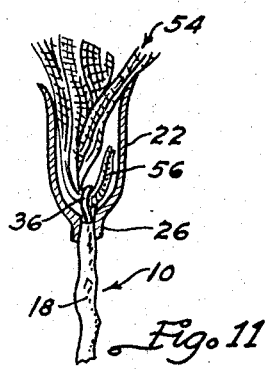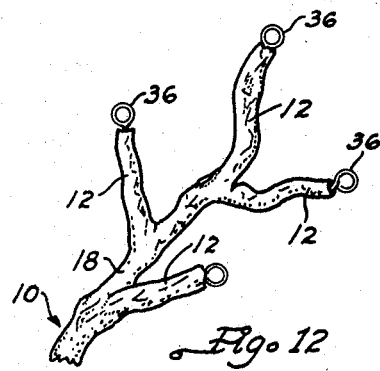

United States Patent Office 3,318,044
Patented May 9, 1967

3,318,044
ARTIFICIAL SUPPORTING MEANS FOR
NATURAL FLOWERS
Morton E. Kise, 433 N. Newberry St.,
York, Pa. 17404
Filed Oct. 20, 1965, Ser. No. 498,280
10 Claims. (Cl. 47—55)

In the mounting of natural flowers of various kinds and types in different kinds of floral arrangements including corsages, funeral sprays of numerous shapes and sizes, bouquets of various kinds and shapes, as well as other arrangements of specialized natures, it has been common practice for a substantial period of time for florists to support and maintain natural flowers and blooms by the use of pieces of wire of various lengths and usually of relatively small gauge, generally either of uncoated steel, or painted green to render the same inconspicuous, said wires being suitably attached to the head of the flower, such as by projecting it into the calyx and then twisting the wire about the stem and thus affording auxiliary means for maintaining the blooms in desired position within the floral arrangement being prepared.

In certain types of floral arrangements where the flowers are disposed in close positions to each other, such as in corsages, wire elements of the type referred to also are used to connect the stems of the natural flowers together, such as by twisting a wire member around the assembled stems of the flowers. In order to provide a more pleasing effect, it also has been customary to wrap suitable tape, of a type known as florist's tape and capable of adhering only to itself and being appropriately colored, around the flower stems, after twisting the wire bracing or positioning members around the stems, so as to mask the wires.

In the preparation of floral arrangements of the type referred to, a very substantial portion of the total time required to prepare the same is tediously consumed by an operator initially preparing each individual flower with a suitable wire twisted around the stem and, for many types of floral arrangements, additionally wrapping florist's tape around the calyx and stem of each flower after the wire has been twisted around the stem, for example. Many dozens of flowers are initially prepared in this manner before construction of an actual, large floral arrangement commences.

Particularly at busy seasons of the year when large volumes of floral arrangements are required, such as at various holidays and also for weddings, large receptions and the like, long hours of employment are required to prepare the desired floral arrangements and the operators engaged to fabricate the same command salaries of substantial proportions. To employ relatively high priced labor of this type simply to initially prepare natural flowers with stiffening wires and florist's tape is very substantially out of proportion to the skill required to perform such tedious and menial type of work and is a wasteful misapplication of talent.

Previous attempts have been made to minimize the manual effort required to prepare natural flowers in the manner described above, but none of these have found any appreciable acceptance by the floral industry. As a result, a very substantial artificial flower industry has been developed in recent years and, to a large extent, has replaced natural flowers.

While such artificial flowers last longer than natural flowers, and although great skill has been used in manufacturing the artificial flowers to render them very highly life-like in appearance, artificial flowers have certain deficiencies, notably among which is the lack of scent, which is present in all natural flowers, and especially those having a pleasant fragrance, such as roses and numerous other so-called sweet-scented flowers. Also, artificial flowers are not acceptable for religious purposes, such as for church functions, where natural flowers symbolize life. In regard to flowers which do not particularly have a sweet scent, however, it is normal for persons viewing said flowers to attempt to smell them to determine if they are natural flowers or artificial ones.

It is the principal object of the present invention to provide relatively simple but highly effective artificial supporting means, principally comprising a stem arrangement readily capable of being suitably shaped, if desired, and an artificial calyx to which the head only of a natural flower, from which the natural stem has been removed from the outer end of the calyx thereof, may be connected quickly and effectively and thereby very substantially eliminate the tedious and boring operations of twisting wires around natural flower stems and masking said wires as now is presently required according to conventional practices in the floral industry.

Another object of the invention is to provide partially prepared coupling members comprising simple wire elements which are quickly insertable through the heads of natural flowers, from the front face thereof, so as to project through the calyx and then quickly be connected to appropriate connecting means provided on the end of artificial stems, after which an artificial cup-like calyx, previously mounted upon the stem, is slidably pushed to the connected end of the stem so as to receive and enclose the connecting means and preferably at least all or a substantial part of the natural calyx of the flower, thereby providing highly life-like artificial stem means upon which a natural flower or bloom is supported and by which it may be quickly mounted in a desired floral arrangement and positioned therein either in its original condition or by bending the artificial stem as required.

A further object of the invention is to provide another form of coupling member of wire-like nature which may be used to attach natural flowers to an artificial stem of the type referred to and concerning which the natural calyx is of a relatively soft or loose nature, whereby one end of the connecting means may be inserted through the calyx transversely and then extended along the natural calyx and beyond the outer end thereof, while the other end is coiled around the calyx and said one end of the connecting means to position it accurately with respect to the calyx for connection to the connecting means on one end of the artificial stem.

Another object of the invention is to provide an artificial stem comprising a wire-like core preferably provided with a loop on one end to comprise connecting means, and said core being covered by artificial means such as synthetic resin, rubber-like material, or the like, and appropriately molded and colored to resemble a natural stem of a flower, and an artificial calyx of cup-like nature, preferably molded from material similar to that from which said sheath of the stem is formed being provided with a constricted end frictionally slidable longitudinally along the stem adjacent the connecting means and suitably flexible to conform the artificial calyx to the connecting means when a natural flower and said artificial stem have been connected to each other, said artificial calyx being moved on the stem to receive all or part of the natural calyx of the flower.

One further object of the invention is to provide artificial stem means having a plurality of branches projecting therefrom in a natural-appearing manner, each of the branches preferably terminating in connecting means to which natural flowers may be attached and an artificial calyx is provided adjacent the outer end of each branch of the artificial stem for concealment of the connection between the natural flower and artificial stem in the manner described hereinabove.

Details of the foregoing objects and of the invention, as well as other objects thereof, are set forth in the following specification and illustrated in the drawings comprising a part thereof.

In the drawings:

FIG. 1 is an exemplary floral arrangement comprising artificial stem means and natural flowers attached to branches of the stem means to resemble a natural floral arrangement in accordance with the principles of the present invention, said floral arrangement being illustrated as being mounted in a receptacle which is illustrated only fragmentarily.

FIG. 2 is a fragmentary sectional view illustrating one embodiment of a coupling member shown in operative engagement with a natural flower in accordance with the present invention.

FIG. 3 is a fragmentary illustration of one end of an artificial stem having connecting means thereon and showing, in partly sectioned manner, an exemplary artificial calyx comprising part of the present invention.

FIG. 4 is a fragmentary view shown partly in vertical section and illustrating a preferred manner of connecting the prepared natural flower shown in FIG. 2 with the artificial stem and artificial calyx illustrated in FIG. 3 and wherein the artificial calyx is mounted in operative position to conceal the connecting mechanism for the natural flower to the artificial stem.

FIG. 5 is an exemplary side elevation of another embodiment of coupling member including the principles of the present invention and showing the same attached to a natural flower having a certain type of calyx to which said embodiment of connecting means is attached in the preferred manner.

FIG. 6 is a fragmentary view of a portion of artificial stem means embodying the principles of the present invention to which another artificial floral stem having a plurality of branches is connected in accordance with the principles of the invention.

FIG. 7 is a view similar to FIG. 2 but showing a slightly different method of attaching the connecting means illustrated therein with respect to a natural flower.

FIGS. 8–11 respectively are exemplary illustrations showing progressive stems relative to the formation of a maline puff and the manner in which one of the same is attached at one end to the connecting means on an artificial stem embodying the principles of the present invention, FIG. 11 showing the final assembly thereof and being illustrated partly in vertical section to show the details of the connection.

FIG. 12 is a fragmentarily illustrated part of the outer end of an artificial stem embodying the principles of the present invention and having a plurality of short branches projecting therefrom, said view illustrating the connecting means on the outer ends of each branch to which natural flowers are to be connected, the artificial calyxes not being illustrated so as to clearly illustrate the stem and branch structure per se.

The essential elements of the present invention comprise artificial stem means 10 which may be formed either as single stems or, as shown in FIGS. 6 and 12, said stems may be provided with a plurality of branches 12 for purposes to be described, as well as artificial leaves placed thereon appropriately. To render such artificial stem means more life-like, and particularly for use in certain floral arrangements such as illustrated in exemplary manner in FIG. 1, artificial leaves 14, either of a single or multiple nature, may be formed upon the artificial stem means. In the preferred construction of said stem means, a central wire-like core 16 is enclosed within a covering or sheath 18 which preferably is molded from suitable synthetic resin, rubber-like material, or the like, so as to be flexible and the contour of the exterior preferably is uneven or, if desired, may be molded with suitably tiny projections of a hair-like nature or otherwise which are formed by the mold in which the sheath 18 is injected or otherwise suitably molded to closely imitate natural flower stems.

In accordance with the principles of the present invention, exemplary natural flowers 20, having full natural beauty and fragrance, are connected to the outer ends of each of the artificial stems 10 or the branches 12. Therefore, in addition to the structure of the artificial stems and branches, the present invention also includes several embodiments of coupling members or connecting means respectively adaptable to different types of natural flowers. By using one or the other of the several embodiments of coupling members or connecting means, it is possible, virtually, to employ the present invention in connection with mounting and supporting artificial flowers of almost any type or variety and have the same arranged in a wide variety of floral pieces or arrangements which include either a very limited number of such flowers or a substantial quantity thereof. The flower thus produced, which embodies the principles of the present invention, actually comprises a combination of natural flowers with artificial stems and other supporting and connecting means including an artificial calyx 22 provided on the outer end of each stem or branch thereof. According to the preferred construction of the calyxes 22, they may be provided in a limited variety of different sizes, especially with respect to diameter and length, and be molded from appropriate synthetic resin or other flexible material similar to that from which the sheaths 18 of the stems are formed. Said calyxes also preferably are cup-shaped and they have either a relatively even or irregular outer end 24 and a constricted opposite end 26 which preferably frictionally engages the sheath 18 of an artificial stem 10 so as to be slidable, preferably frictionally, therealong, but capable of being maintained in desired, selected operative position thereon at the completion of the connection of a natural flower to the outer end of each stem or its branch.

For purposes of connecting a natural bloom or flower 20 to an artificial stem of the type provided by the present invention, the natural stem of the flower is severed from the outer end of the natural calyx 28. One embodiment of coupling member 30 is shown in FIGS. 2 and 4, and is capable of use with substantially all flowers suited for use with the present invention, except roses and carnations. Coupling member 30 preferably comprises a piece of metallic wire or other similar bendable, wire-like material which preferably is capable of retaining a given shape after being bent into that shape from straight condition or the like. Such wire or wire-like material is selected of suitable length and gauge and, if desired, also may be painted or otherwise appropriately colored so as to be inconspicuous in use with respect to natural flowers with which they are employed.

One end of the coupling member 30 is bent upon itself to form a hook 32. The opposite straight end of member 30 is inserted through the face of the flower, substantially centrally thereof, and is pushed generally axially through the flower and the natural calyx 28 thereof until the hook 32 is embedded preferably within the face of the flower in an inconspicuous manner. The short end of the hook engages the body of the head of the flower and, depending upon the nature of the flower, may also be embedded in the body of the calyx so as to be anchored therein and the outer end 34 of the connecting member projects beyond the outer end of the natural calyx 28.

In preparing various types of floral arrangements, with which the present invention is to be employed, such as corsages, sprays, bouquets and the like, substantially all, if not all, of the flowers are prepared by cutting the natural stems from the outer ends of the calyxes. If the flowers are of such type as to have the embodiment of coupling member 30 connected thereto, such members are inserted through the heads thereof in preparation for connection of such natural flowers to artificial stems.

While the present invention is appropriate for use quite extensively in preparing many types of floral arrangements, it should be noted that bouquets for hospitals, centerpieces and certain types of home use, flowers having the natural stems remaining thereon are employed. Such connection of the coupling members to the natural flower is accomplished in a very brief period of time in comparison with the time previously required in accordance with presently used techniques of using substantial lengths of wire, inserting the same at one end into the natural calyx of the flower and wrapping or coiling the wire around the natural stem of the flower, followed by the application of suitable florist's tape to such assembly.

To facilitate the rapid preparation of such natural flowers with said connecting means, it is contemplated in accordance with the invention to furnish such coupling members in the shape shown in FIG. 2, preferably in different standard lengths and also in different wire gauges. If preferred, however, rather than form the coupling members by mass production techniques to have the hooks 32 formed on the outer end thereof, by reference to FIG. 7, it will be seen that the coupling member 30' may be provided in appropriate length and one end thereof is inserted through the outer face of the head of the flower from the end of the calyx thereof, or initially through the head of the flower and then through the calyx, the outer end 30'' thereof being suitably bent to form the hook 32' before pulling said hook into embedded engagement within the head of the flower 20. Such manner of attachment of the connecting means may be preferred in regard to certain types of flowers as compared with other types to which the preformed coupling members 30 may be more suited for use.

After the natural flowers 20 have been prepared with the coupling members 30 embedded therein so that the outer ends 34 thereof project from the outer ends of the calyxes 28, said flowers are attached to preferably loop-like connecting means 36 formed on the outer ends of the wire-like cores 16 of the artificial stem means 10, such connecting means being illustrated clearly in FIGS. 3 and 4. Connection of the coupling members 30 to the connecting means 36 is easily accomplished simply by inserting the outer ends 34 through the loop-like connecting means and then bending the outer ends 34 reversely upon themselves in the exemplary manner illustrated in FIG. 4 so as to produce highly effective connection of the natural flower to the artificial stem means 10.

Such connection is accomplished while the artificial calyxes 22 are disposed in retracted position upon the stem means 10 and after the connection is made, the artificial calyxes 22 quickly are slidably moved frictionally toward the outer ends of the stem means 10 until the outer terminal end 24 of the artificial calyx either engages the natural calyx 28 or actually engages the petals of the natural flower 20. The cup-like arrangement of the artificial calyx is so formed as readily to enclose at least the connected wire-like members shown in FIG. 4 and also very substantially enclosed at least part of the natural calyx 28.

Due to the fact that the artificial calyx 22 is appropriately colored and otherwise has a suitable shape and texture so as to either resemble or be harmonious with the natural calyx of the flower, a highly desirable combination flower product is produced comprising a natural flower or bloom and an artificial stem means and calyx including appropriate connecting means which are concealed when the combination is completed. The complete assembly of such natural flower and artificial stem means and connecting element is quickly accomplished with a minimum of tedium and consumption of time.

After such combination flower elements are prepared, particularly if the stem means 10 are single stems, possibly having artificial leaves 14 molded thereon, they are ready for inclusion in bouquet arrangements, sprays, corsages or the like, and may be used either as single blossoms or in clusters or bunches of such blossoms which, if desired, may be appropriately connected together suitably by wrapping additional wire or tape means therearound such as presently employed in the floral industry.

The artificial stem means 10 also are capable readily of being twisted or bent into any of a wide variety of shapes or configurations and will retain the same when inserted into a desired floral arrangement. The stem means also are sufficiently stiff that they may be inserted in the base material of bouquets or floral sprays and the like, such as porous blocks or slabs of foam products, one brand of which is Styrofoam, presently employed as a base for such arrangements and the artificial stems can quickly be pushed into such base material with the same or even improved facility over that with which natural flower stems can be mounted in the same, even when reinforced with wire twisted around such natural stems.

Another embodiment of coupling member is illustrated in FIG. 5 in association with a natural flower 20' which is of a type having the calyx 28' of a different shape and physical composition from that illustrated with respect to the flowers 20 in FIGS. 1–4. For example, the flower 20' may be a carnation which has a calyx 28' that is relatively large in comparison with the flower and is of a relatively soft or spongy nature. Roses also require this type of coupling member. Under such circumstances a hook-like means on the outer end of the coupling member for engaging the face of the natural flower is not the most suitable construction for firm connection of the coupling member to such flower. Accordingly, the additional embodiment illustrated in FIG. 5 has been devised for flowers such as carnations and roses, and contemplates the use of a preferably wire-like coupling member 38 which initially is appreciably longer than the coupling member 30 of the embodiment shown in FIGS. 2–4.

Coupling member 38 is connected to the natural calyx 28' of the larger type preferably by inserting one end thereof transversely through the calyx 28', intermediately of the ends thereof, as shown at 40 in FIG. 5. One end 42 is then bent to extend longitudinally along one side of the calyx 28' and the terminal end thereof is formed into a hook-like configuration 44.

The opposite end 46 of the coupling member 38 which has been inserted at 40 transversely through the calyx then is spirally wound around the calyx a number of convolutions, preferably also being indented a certain amount into the surface thereof, so as to secure said one leg 42 of the connecting member effectively to the calyx 28', as illustrated in exemplary manner in FIG. 5. The terminal end 48 of the other leg 46 of the coupling member may be bent so as to be projected into the body of the calyx 28', if desired, or otherwise simply disposed along the outer surface thereof.

After the above-described embodiment of coupling member 38 has been securely attached to the calyx 28' of the flower 20', the same is readied for connection to the connecting means 36 on the outer end of the stem means 10, as in regard to the embodiment of connecting means shown in FIGS. 2–4. In view of the relatively larger size of the calyx 28' of the embodiment shown in FIG. 5 with respect to the calyx of the flower 20 shown in the preceding embodiment, an artificial calyx 22 of appropriate size will be required to conceal the calyx 28', and especially the coiled coupling member 38 surrounding the same, as well as the actual connected elements 44 and 36.

Referring to FIGS 6 and 12, it will be seen that the invention may be applied not only to a single type stem but to one having a number of branches 12, as referred to above. Further, particularly as shown in FIG. 6, a sprig-like unit 50 may be formed with a limited number of branches 12 thereon and the end 52 thereof may be inserted through the connecting loop 36 of another artificial stem means 10, the end 52 being arranged, for example, in hook-like configuration to be received through the connecting means 36. When such connection has been effected, the artificial calyx 22 is moved over the connection so as to conceal it, whereby it will be seen that a number of variations of arrangements are possible to create life-like appearing plants or floral arrangements, as desired.

In preparing floral arrangements, it is quite common practice to include therein, in addition to natural flowers, such as described hereinabove, decorative elements and accessories, some of which somewhat resemble flowers and are known in the floral industry as malines. Other accessories may comprise artificial grape clusters, Christmas balls, and the like. An exemplary maline 54 is shown in FIG. 8 in process of being formed and connected to a suitable supporting means such as one of the artificial stem means 10 of the present invention. Malines usually are formed from relatively stiff organdy-type material which is net-like, the same usually being dyed appropriate colors either complementary to or otherwise harmonious with the colors of natural flowers with which the malines are included in desired floral arrangements, such as bouquets, sprays, and corsages.

A piece of such gauze-like or net material of suitable size and shape is cut by scissors from stock material and is formed into an esthetically attractive irregular arrangement somewhat resembling a group of flower petals, as illustrated in FIG. 8. This is done by folding or otherwise shaping the piece of material with respect to the center thereof, said center portion being grasped between the thumb and forefingers of the operator, as shown in FIG. 8, and by slightly twisting or twirling the central portion, whereby it becomes the attaching end 56 of the maline 54, as shown in FIG. 9. This stem-like end 56 is threaded through the loop-like connecting means 36 on the end of the wire core 16 of the artificial stem means 10.

It will be seen particularly from FIG. 9 that the loop-like connecting means 36 is preferably formed by twisting a short end of the wire around the core 16 several convolutions, although, if preferred, and if the wire is of sufficient stiffness from which the core 16 and connecting means 36 are formed, it will be sufficient simply to form the connecting means 36 into a loop-like arrangement somewhat as shown in FIG. 12, for example, and this will suffice to have the terminal ends 34 and 44 of the several embodiments of coupling members, or the attaching end 56 of a maline, attached thereto.

In connecting the attaching end 56 of the maline puff to the connecting means 36, the end 56 is pushed through the loop of means 36 and is bent upwardly to form a bight, such as illustrated in FIG. 10. While holding the bight in this relationship relative to the main body of the maline 54 and loop 36, the operator then slides the artificial calyx 22 up the stem means 10, frictionally with respect to the sheath 18, until the engaged bight of the maline is engaged in pinching manner by the interior of the constricted end 26 of the artificial calyx 22, substantially as in the manner illustrated in exemplary fashion in FIG. 11. This engagement of end 56 of the maline puff by the constricted end 26 of the artificial calyx may even partially deform the same but the nature of the material of the calyx 22 is such as to permit this to occur. The frictional engagement between calyx 22 and sheath 18 will maintain the end 26 in firmly secured engagement with the bight of the maline to prevent the attaching end 56 thereof from being accidentally removed from the connecting means. It will be understood that most, if not all, pre-wired floral accessories can be connected to artificial supporting means of the type herein described by the procedure set forth above relative to maline puffs.

The completed maline puff very closely resembles and is completely harmonious with natural flowers of complementary or harmonious color. For example, in a corsage in which five or six natural flowers are used, possibly two or perhaps three malines might be inserted appropriately. In a floral bouquet of a dozen natural flowers, possibly three or four malines might be scattered around in the arrangement of the natural flowers for purposes of adding variety and otherwise enhancing the esthetic beauty of the arrangement.

It thus will be seen that the artificial supporting and holding means of the present invention is equally adapted for supporting maline puffs as natural flowers, in a desired floral arrangement, as well as other artificial floral accessories mentioned above. However, it will be understood that in regard to arranging and supporting a maline puff or other artificial floral accessories with respect to the supporting means comprising the present invention, it generally is not necessary to utilize a coupling member since the twisted attaching end 56 of the maline puff, as well as ends or hooks on other accessories usually serve a similar purpose as the coupling members of the embodiments respectively illustrated in FIGS. 2–4 and 5.

From the foregoing, it will be seen that the present invention provides very simple, quickly and easily operated, and highly effective artificial supporting means for natural flowers in a manner to permit the formation of floral arrangements having the natural scent of natural flowers as well as the beauty thereof, while eliminating the time-consuming and monotonous chore of the twisting of supporting and bracing wires around the natural stems of natural flowers as is presently necessary for the formation of floral arrangements in accordance with the techniques now used in the floral industry. In addition to eliminating the tedium referred to, skilled floral workers now may be employed to use the majority of their time much more usefully and constructively in the actual formation of floral arrangements as distinguished from a very substantial part of their time being consumed in the initial, monotonous preparation of flowers for such arrangement as now is required according to current techinques.

The artificial stem means and coupling members as well as the artificial calyxes, which all comprise either singly or collectively vital portions of the present invention, may be formed by mass production machinery and require only a minimum of assembly operations to render the same ready for use, and particularly for attachment of natural flowers and blooms thereto and by which such flowers or blooms are supported in very life-like or natural and esthetically pleasing appearance.

While the invention has been described and illustrated in its several preferred embodiments, it should be understood that the invention is not to be limited to the precise details herein illustrated and described since the same may be carried out in other ways falling within the scope of the invention as claimed.

I claim:

1. Artificial flower means to produce a combination natural and artificial flower comprising in combination, an artificial flower stem comprising an elongated artificial member having connecting means on one end, an elongated coupling member having means on one end shaped to be projected through the calyx of a natural flower from which the stem has been detached adjacent the end of the natural calyx of the flower and having additional means on the other end pre-shaped to interlock with said calyx, said coupling member when projected through said calyx having additional means positioned adjacent the detached end of the natural calyx and arranged to connectingly engage said connecting means on said artificial stem, and an artificial cup-like calyx longitudinally movable on said stem toward the calyx of said natural flower to receive and conceal said connecting means and at least the outer end of the natural calyx of the natural flower when connected to said artificial stem and thereby provide a natural appearing flower having natural scent and beauty mounted upon an artificial stem.

2. The artificial flower means according to claim 1 in which said coupling member is a wire-like member capable of being bent and substantially retaining any shape into which it is bent and initially having one straight end portion arranged to be inserted through the natural calyx of a natural flower and projected therebeyond for direct connection to said connecting means on said stem.

3. The artificial flower means according to claim 2 in which said coupling member is of sufficient length for one end to be projected through the calyx of a natural flower transversely to the axis thereof and intermediately of the ends thereof and said one end being extendible along said calyx lengthwise for projection beyond the outer end thereof and the other end being coilable around the calyx and said one end of the member to maintain it in position thereon for secure connection thereto, one of said ends projecting beyond the outer end of said calyx and being hook-shaped for connection to said connecting means of said artificial stem.

4. The artificial flower means according to claim 2 in which one end of said coupling member is bent reversely to form a hook comprising said interlocking means on said other end thereof arranged to be embedded in the outer face of a natural flower and the opposite end of said member after being projected through and beyond the outer end of the natural calyx of said flower being bendable for connection to said connecting means on said artificial stem.

5. The artificial flower means according to claim 1 in which said connecting means on said one end of said artificial stem is loop-like and said artificial calyx is frictionally slidable on said stem to maintain the same in operative position thereon when concealing said connecting means.

6. The artificial flower means according to claim 1 in which said artificial stem comprises a wire-like core covered with artificial material simulating a natural flower stem.

7. The artificial flower means according to claim 6 in which one end of said wire-like core projects beyond the covering thereon and is formed into a loop-like shape to receive one end of said coupling member for connection therewith.

8. The artificial flower means according to claim 6 in which the connecting means is a loop-like configuration on the outer end of said core adjacent the end of said covering, and one end of said artificial calyx is constricted and slidable frictionally in opposite directions upon the covering of said stem to maintain desired positions thereon.

9. The artificial flower means according to claim 1 in which said artificial calyx is molded from flexible material capable of readily yielding to conform to the shape of the natural flower members and coupling means enclosed therein.

10. An artificial stem connectable to a natural flower or similar decorative element such as a maline normally used in floral arrangements, said stem comprising an elongated member simulating a flower stem and having a loop-like connecting means on one end thereof, and a cup-like artificial calyx having a constricted end frictionally slidable on the end of said stem having said connecting means thereon, said constricted end of said artificial calyx being slidable toward said loop-like connecting means after the insertion of one end of a decorative element therethrough and being reversely bent, thereby effecting a pinching engagement with said inserted and reversely bent end of said element and frictionally hold the same against accidental removal from said connecting means on said stem.

References Cited by the Examiner
UNITED STATES PATENTS

| | | | |
|---|---|---|---|
| 144,446 | 11/1873 | Craig | 47—55 |
| 1,730,628 | 10/1929 | Rogers | 161—30 |
| 1,748,636 | 2/1930 | Crockett. | |
| 2,331,440 | 10/1943 | Thomas | 47—55 |
| 2,390,858 | 12/1945 | Walker | 47—55 X |
| 3,002,308 | 10/1961 | Decamp | 161—27 |

ANTONIO F. GUIDA, *Primary Examiner.*

ABRAHAM G. STONE, R. CARTER,
*Assistant Examiners.*